(12) United States Patent
Damato

(10) Patent No.: US 8,523,448 B1
(45) Date of Patent: Sep. 3, 2013

(54) X-RAY TUBE BEARING

(75) Inventor: Frank Damato, Keene, NH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 13/591,849

(22) Filed: Aug. 22, 2012

(51) Int. Cl.
*F16C 33/66* (2006.01)
*H01J 35/00* (2006.01)

(52) U.S. Cl.
USPC ............ 384/517; 378/132; 378/144; 384/518

(58) Field of Classification Search
USPC ................ 384/517, 518, 563, 504, 512, 515, 384/99; 378/131, 132, 144
See application file for complete search history.

(56) References Cited

U.S. PATENT DOCUMENTS

| | | | |
|---|---|---|---|
| 4,033,644 A | | 7/1977 | Reneerkens |
| 4,325,590 A | * | 4/1982 | Pethis ........................... 384/518 |
| 4,652,219 A | | 3/1987 | McEachern, Jr. et al. |
| 5,000,589 A | * | 3/1991 | Ogata et al. .................... 384/611 |
| 5,140,624 A | * | 8/1992 | Chrisien ....................... 378/132 |
| 5,628,571 A | | 5/1997 | Ohta et al. |
| 6,309,109 B1 | * | 10/2001 | Chuang ......................... 384/537 |
| 6,502,995 B1 | * | 1/2003 | Ozsoylu ......................... 384/496 |
| 6,623,166 B2 | * | 9/2003 | Andren et al. ................. 384/517 |
| 6,735,281 B2 | | 5/2004 | Higgins et al. |
| 7,165,471 B2 | | 1/2007 | Joki et al. |
| 7,995,708 B2 | * | 8/2011 | Andrews et al. ............... 378/131 |
| 8,240,923 B2 | | 8/2012 | Galehouse et al. |

FOREIGN PATENT DOCUMENTS

| WO | 2008058267 | 5/2008 |
|---|---|---|
| WO | 2008061076 | 5/2008 |

* cited by examiner

*Primary Examiner* — Thomas R Hannon
*Assistant Examiner* — Kashif Mohammed
(74) *Attorney, Agent, or Firm* — Michael Best & Friedrich LLP

(57) ABSTRACT

An X-ray tube bearing includes an outer housing having an axial bore, a shaft at least partially received within the axial bore, a first outer ring positioned within the axial bore and surrounding a first portion of the shaft, and a second outer ring at least partially received within the axial bore and surrounding a second portion of the shaft. The second outer ring includes a radially outwardly extending flange engaged with the outer housing to limit the extent to which the second outer ring is received within the axial bore. The X-ray tube bearing also includes a first biasing member biasing the flange into engagement with the outer housing, and a second biasing member positioned within the axial bore for exerting an axial preload force between the first and second outer rings.

20 Claims, 2 Drawing Sheets

US 8,523,448 B1

X-RAY TUBE BEARING

FIELD OF THE INVENTION

The present invention relates to bearings, and more particularly to X-ray tube bearings.

BACKGROUND OF THE INVENTION

X-ray tube bearings are typically incorporated within an X-ray tube for supporting a rotating anode. Such X-ray tubes also include a cathode which, in conjunction with the rotating anode, develops a high voltage differential for accelerating electrons from the cathode toward a focal track positioned on a target of the anode. As the electrons accelerate and strike the focal track, some of the electrons' kinetic energy is converted into electromagnetic waves of very high frequency (i.e., X-rays), which are emitted from the tube toward an object.

SUMMARY OF THE INVENTION

The present invention provides, in one aspect, an X-ray tube bearing including an outer housing having an axial bore therein, a shaft at least partially received within the axial bore, a first outer ring positioned within the axial bore and surrounding a first portion of the shaft, a first plurality of rolling elements positioned between the first outer ring and the first portion of the shaft for rotatably supporting the first portion of the shaft relative to the first outer ring, and a second outer ring at least partially received within the axial bore and surrounding a second portion of the shaft. The second outer ring includes a radially outwardly extending flange engaged with the outer housing to limit the extent to which the second outer ring is received within the axial bore. The X-ray tube bearing also includes a second plurality of rolling elements positioned between the second outer ring and the second portion of the shaft for rotatably supporting the second portion of the shaft relative to the second outer ring, a first biasing member biasing the flange into engagement with the outer housing, and a second biasing member positioned within the axial bore for exerting an axial preload force between the first and second outer rings.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
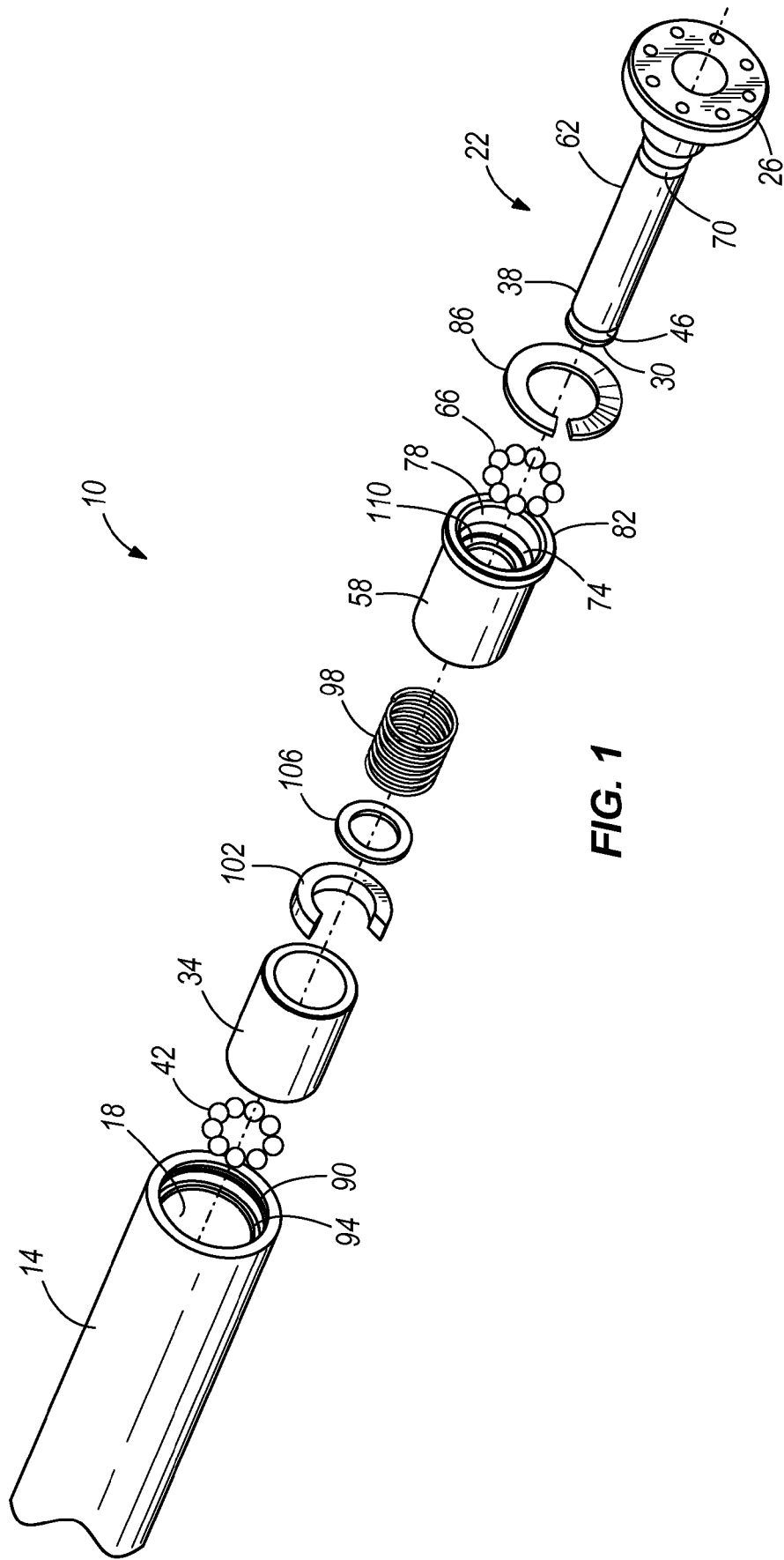
FIG. 1 is an exploded perspective view of an X-ray tube bearing of the invention.
Figure 2:
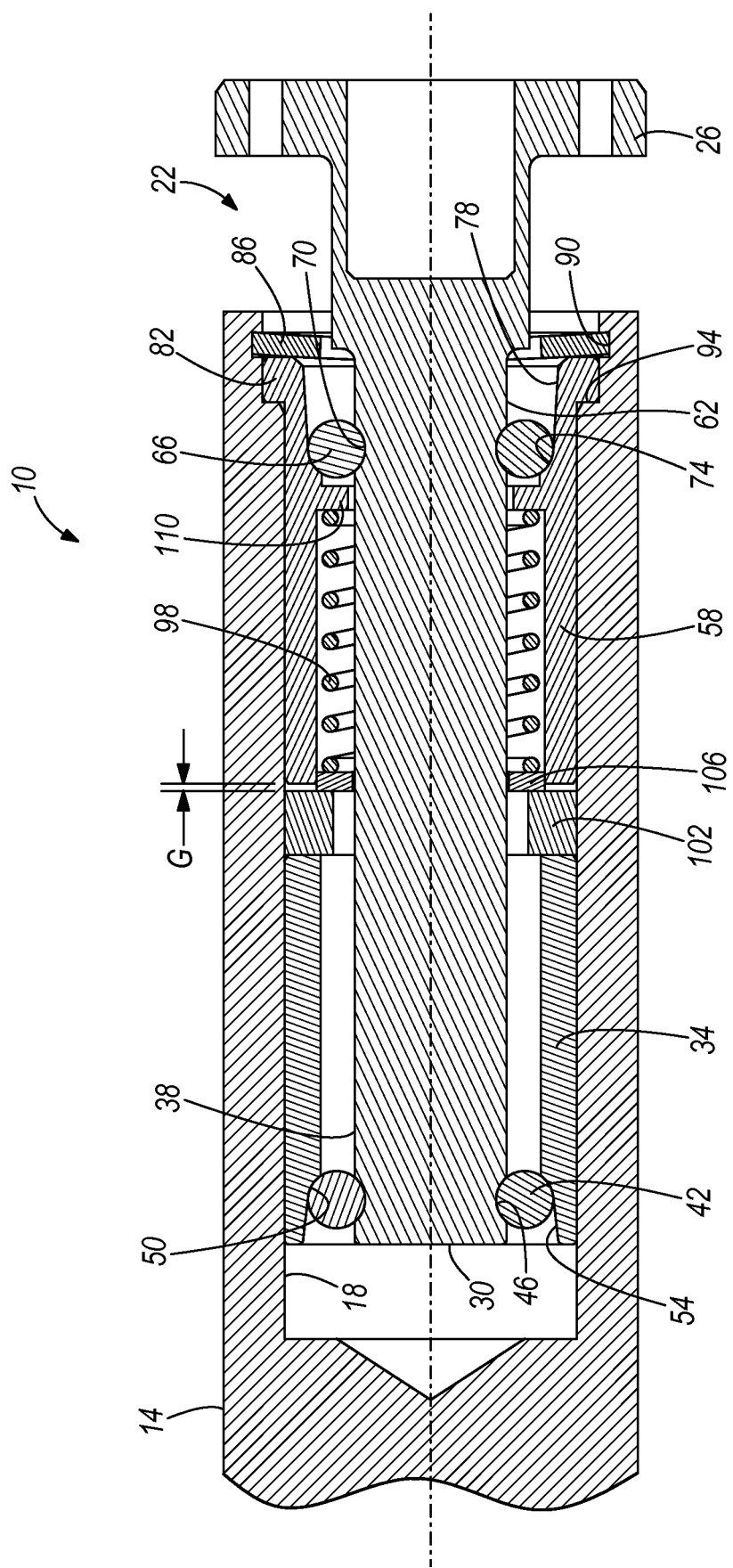
FIG. 2 is an assembled, longitudinal cross-sectional view of the bearing of FIG. 1.

FIGS. 1 and 2 illustrate an X-ray tube bearing 10 for supporting a rotating anode of an X-ray machine (not shown). Such an X-ray machine is shown and described in U.S. Pat. No. 7,995,708, the entire contents of which are incorporated herein by reference. The bearing 10 includes an outer housing 14 having an axial bore 18 and a shaft 22 at least partially received within the axial bore 18. The shaft 22 includes a hub 26 positioned outside the axial bore 18 to which the rotating anode of the X-ray machine is attached, and an opposite distal end 30 in facing relationship with an end of the axial bore 18. The outer housing 14 may be fixed or otherwise stationary within the X-ray machine, with the shaft 22 (and the attached rotating anode) being rotatable relative to the housing 14.

With continued reference to FIGS. 1 and 2, the bearing 10 also includes a first or rear outer ring 34 positioned within the axial bore 18 of the housing 14 and surrounding a first or rear portion 38 of the shaft 22, and rolling elements 42 (e.g., balls) positioned between the rear outer ring 34 and the rear portion 38 of the shaft 22 for rotatably supporting the rear portion 38 of the shaft 22 relative to the rear outer ring 34. The rear portion 38 of the shaft 22 and the rear outer ring 34 include respective raceways 46, 50 on which the rolling elements 42 are maintained (FIG. 2). The raceway 46 on the rear portion 38 of the shaft 22 is located proximate the distal end 30 of the shaft 22, whereas the rear outer ring 34 includes a tapered opening 54 adjacent the raceway 50 to permit insertion of the rolling elements 42 between the respective raceways 46, 50 from the left from the frame of reference of FIG. 2. The raceways 46, 50 are shaped to inhibit the shaft 22 from being moved, relative to the rear outer ring 34, toward the right from the frame of reference of FIG. 2. Also, the outer diameter of the rear outer ring 34 is sized to provide a clearance fit between the rear outer ring 34 and the outer housing 14 to permit the rear outer ring 34 to "float" within the axial bore 18 as the bearing 10 is heated from room or ambient temperature to an operating temperature of the X-ray machine to account for differences in the coefficients of thermal expansion between the components of the bearing 10. Also, the clearance fit of the rear outer ring 34 within the axial bore 18 permits the rear outer ring 34, together with the other components of the bearing 10, to be removed from the axial bore 18 for servicing or replacement.

The bearing also includes a second or front outer ring 58 at least partially received within the axial bore 18 and surrounding a second or front portion 62 of the shaft 22, and rolling elements 66 (e.g., balls) positioned between the front outer ring 58 and the front portion 62 of the shaft 22 for rotatably supporting the front portion 62 of the shaft 22 relative to the front outer ring 58. The front portion 62 of the shaft 22 and the front outer ring 58 include respective raceways 70, 74 on which the rolling elements 66 are maintained. The raceway 70 on the front portion 62 of the shaft 22 is located proximate the hub 26, whereas the front outer ring 58 includes a tapered opening 78 adjacent the raceway 74 to permit insertion of the rolling elements 66 between the respective raceways 70, 74 from the right from the frame of reference of FIG. 2. The raceways 70, 74 are shaped to inhibit the shaft 22 from being moved, relative to the front outer ring 58, toward the left from the frame of reference of FIG. 2. Also, the outer diameter of the front outer ring 58 is sized to provide a clearance fit between the front outer ring 58 and the outer housing 14 to permit the front outer ring 58, together with the other components of the bearing 10, to be removed from the axial bore 18 for servicing or replacement.

With continued reference to FIG. 2, the front outer ring 58 includes a radially outwardly extending flange 82 engaged with the outer housing 14 to limit the extent to which the front outer ring 58 is received within the axial bore 18. The bearing 10 further includes a biasing member in form of a bowed retaining ring 86 positioned within an internal circumferential groove 90 on an inner peripheral surface of the outer housing 14 at least partially defining the axial bore 18. The ring 86 biases the flange 82 into engagement with an axially facing surface 94 of the outer housing 14 and maintains the flange 82 in engagement with the outer housing 14 while the bearing 10 is in operation. The bowed retaining ring 86 exerts an axial preload force against the flange 82 to maintain the flange 82 in engagement with the outer housing 14. In a design of the X-ray machine in which the bearing 10 and the rotating anode are vertically oriented, the axial preload force exerted by the bowed retaining ring 86 exceeds the combined weight of the shaft 22 and the rotating anode. Alternatively, the bowed retaining ring 86 may be replaced by a discrete spring and a flat retaining ring for exerting an axial preload force against flange 82 to maintain the flange 82 in engagement with the outer housing 14.

With reference to FIGS. 1 and 2, the bearing 10 also includes an internal biasing member (e.g., a compression spring 98) positioned within the axial bore 18 for exerting an axial preload force between the rear outer ring 34 and the front outer ring 58. Alternatively, the biasing member may be configured in any of a number of different ways for exerting the axial preload force between the outer rings 34, 58. As shown in FIG. 2, no additional components of the bearing 10 (e.g., an external spring) are positioned between the end of the axial bore 18 and the distal end 30 of the shaft 22.

With reference to FIGS. 1 and 2, the bearing 10 also includes a spacer 102 positioned between the outer rings 34, 58 and a washer 106 positioned between the compression spring 98 and the spacer 102. The washer 106 directly contacts or bears against the spacer 102, thereby transferring the axial preload force of the compression spring 98 to the spacer 102 and the rear outer ring 34. As shown in FIG. 1, the spacer 102 includes a "C" cross-sectional shape to permit the spacer 102 to be inserted between the outer rings 34, 58 subsequent to assembly of the rolling elements 42, 66 and the outer rings 34, 58 onto the shaft 22. The front outer ring 58 includes a radially inwardly extending flange 110 against which the compression spring 98 also bears (FIG. 2). As such, the spring 98 preloads the rolling elements 42 against the raceway 46 on the rear portion 38 of the shaft 22 via the raceway 50 on the rear outer ring 34, while the spring 98 preloads the rolling elements 66 against the raceway 70 on the front portion 62 of the shaft 22 via the raceway 74 on the front outer ring 58.

The axial preload force exerted by the spring 98 is directed between the outer rings 34, 58 for maintaining a gap G between the outer rings 34, 58 at all times during non-operation and operation of the bearing 10. Particularly, the gap G is maintained between the front outer ring 58 and the spacer 102, which is sized with a particular thickness to provide some endplay of the shaft 22 at room or ambient temperature (i.e., the non-operating temperature of the X-ray machine). Such endplay results from movement of the shaft 22 and the rear outer ring 34 relative to the front outer ring 58, against the bias of the compression spring 98.

After the bearing 10 has reached its operating temperature (e.g., between 300-500 degrees Celsius), differences in the coefficients of thermal expansion of the various components of the bearing 10 may cause the width of the gap G to decrease. However, the gap G is never entirely closed, thereby maintaining the axial preload force exerted by the compression spring 98 on the rolling elements 42, 66 and the shaft 22 substantially constant throughout the range of temperatures experienced by the bearing 10, during both ambient conditions and operating conditions of the X-ray machine. Maintaining the gap G in this manner with the compression spring 98 otherwise prevents direct contact of the spacer 102 with both the rear outer ring 34 and the front outer ring 58 at the same time, which could increase the preload of the rolling elements 42, 66 on the shaft 22. In turn, the increased preload could increase wear of the rolling elements 42, 66 and the shaft 22.

To assemble the bearing 10, the retaining ring 86 is first positioned on the shaft 22, near the hub 26 of the shaft 22. The front outer ring 58 is then positioned on the front portion 62 of the shaft 22. The compression spring 98 is then positioned on the shaft 22 within the front outer ring 58 and seated against the flange 110. The washer 106 is then positioned on the shaft 22 and engaged with the spring 98. The rear outer ring 34 is positioned on the rear portion 38 of the shaft 22, and then the rolling elements 42, 66 are loaded, individually or grouped, between the respective raceways 46, 50 and 70, 74. The spacer 102 is then positioned between the outer rings 34, 58, with the shaft 22 passing through the slot in the spacer 102, to preload the rolling elements 42, 66 against the respective raceways 46, 50 and 70, 74. As a result, the pre-assembled shaft 22, outer rings 34, 58, rolling elements 42, 66, spring 98, spacer 102, and washer 106 may be handled without substantial concern for the rolling elements 42, 66 being dislodged or otherwise displaced from the raceways 46, 50 and 70, 74. The pre-assembled shaft 22, outer rings 34, 58, rolling elements 42, 66, spring 98, spacer 102, and washer 106 are then positioned within the axial bore 18 of the outer housing 14, with the flange 82 limiting the extent to which these components are received within the bore 18.

Lastly, the retaining ring 86 is inserted within the groove 90 in the outer housing 14 to preload the front outer ring 58 against the housing 14. The retaining ring 86 may be removed from the groove 90 to remove the pre-assembled shaft 22, outer rings 34, 58, rolling elements 42, 66, spring 98, spacer 102, and washer 106 from the axial bore 18 for servicing or replacement.

Various features of the invention are set forth in the following claims.

What is claimed is:

1. An X-ray tube bearing comprising:
   an outer housing including an axial bore therein;
   a shaft at least partially received within the axial bore;
   a first outer ring positioned within the axial bore and surrounding a first portion of the shaft;
   a first plurality of rolling elements positioned between the first outer ring and the first portion of the shaft for rotatably supporting the first portion of the shaft relative to the first outer ring;
   a second outer ring at least partially received within the axial bore and surrounding a second portion of the shaft, the second outer ring including a radially outwardly extending flange engaged with the outer housing to limit the extent to which the second outer ring is received within the axial bore;
   a second plurality of rolling elements positioned between the second outer ring and the second portion of the shaft for rotatably supporting the second portion of the shaft relative to the second outer ring;
   a first biasing member biasing the flange into engagement with the outer housing; and
   a second biasing member positioned within the axial bore for exerting an axial preload force between the first and second outer rings.

2. The X-ray tube bearing of claim 1, wherein the outer housing includes an axially facing surface against which the flange is engaged.

3. The X-ray tube bearing of claim 1, wherein the outer housing includes a circumferential groove on an inner peripheral surface at least partially defining the axial bore, and wherein the first biasing member is a bowed retaining ring at least partially received within the groove.

4. The X-ray tube bearing of claim 3, wherein the retaining ring is engaged with an axially facing surface of the flange.

5. The X-ray tube bearing of claim 1, wherein the first portion of the shaft and the first outer ring include respective raceways on which the first plurality of rolling elements are maintained.

6. The X-ray tube bearing of claim 5, wherein the second portion of the shaft and the second outer ring include respective raceways on which the second plurality of rolling elements are maintained.

7. The X-ray tube bearing of claim 6, wherein the second biasing member preloads the first plurality of rolling elements against the raceway on the first portion of the shaft via the raceway on the first outer ring.

8. The X-ray tube bearing of claim 7, wherein the second biasing member preloads the second plurality of rolling elements against the raceway on the second portion of the shaft via the raceway on the second outer ring.

9. The X-ray tube bearing of claim 1, wherein the second biasing member is configured as a compression spring, and wherein the axial preload force is directed between the first and second outer rings for maintaining a gap between the first and second outer rings.

10. The X-ray tube bearing of claim 9, further comprising a spacer positioned between the first and second rings, wherein the compression spring exerts the axial preload force against the spacer for maintaining the gap between the spacer and the second outer ring.

11. The X-ray tube bearing of claim 10, further comprising a washer positioned between the compression spring and the spacer, wherein the compression spring exerts the axial preload force against the spacer via the washer.

12. The X-ray tube bearing of claim 11, wherein the second outer ring includes a radially inwardly extending flange, and wherein the compression spring is positioned between the washer and the radially inwardly extending flange.

13. The X-ray tube bearing of claim 10, wherein the spacer is configured having a "C" cross-sectional shape.

14. The X-ray tube bearing of claim 1, wherein the shaft includes a hub positioned outside the axial bore and an opposite distal end.

15. The X-ray tube bearing of claim 14, wherein the raceway on the first portion of the shaft is located proximate the distal end.

16. The X-ray tube bearing of claim 14, wherein the raceway on the second portion of the shaft is located proximate the hub.

17. The X-ray tube bearing of claim 14, wherein the first biasing member maintains the flange in engagement with the outer housing in operation of the bearing.

18. The X-ray tube bearing of claim 17, wherein the first biasing member exerts a second axial preload force against the flange to maintain the flange in engagement with the outer housing.

19. The X-ray tube bearing of claim 14, wherein the second biasing member is positioned between the shaft and at least one of the first and second outer rings, wherein the distal end of the shaft is in facing relationship with an end of the axial bore, and wherein no additional components of the bearing are positioned between the end of the axial bore and the distal end of the shaft.

20. The X-ray tube bearing of claim 1, wherein the first biasing member maintains the flange in engagement with the outer housing in operation of the bearing, and wherein the first outer ring floats axially within the axial bore against the axial preload force.

\* \* \* \* \*